(12) United States Patent
Duan

(10) Patent No.: US 10,593,298 B2
(45) Date of Patent: Mar. 17, 2020

(54) DISPLAY CONTROL DEVICE, DISPLAY CONTROL METHOD, AND DISPLAY APPARATUS

(71) Applicant: BOE TECHNOLOGY GROUP CO., LTD., Beijing (CN)

(72) Inventor: Ran Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/576,423

(22) PCT Filed: Jun. 23, 2017

(86) PCT No.: PCT/CN2017/089764
§ 371 (c)(1),
(2) Date: Nov. 22, 2017

(87) PCT Pub. No.: WO2018/032876
PCT Pub. Date: Feb. 22, 2018

(65) Prior Publication Data
US 2019/0172424 A1 Jun. 6, 2019

(30) Foreign Application Priority Data
Aug. 19, 2016 (CN) .......................... 2016 1 0695970

(51) Int. Cl.
*G09G 5/36* (2006.01)
*G06T 15/00* (2011.01)
*G06T 3/40* (2006.01)

(52) U.S. Cl.
CPC .............. *G09G 5/363* (2013.01); *G06T 3/40* (2013.01); *G06T 15/005* (2013.01);
(Continued)

(58) Field of Classification Search
CPC ...................... G06T 1/20; G06T 3/4038; G06T 2207/20021; G06T 2200/28; G06T 3/40;
(Continued)

(56) References Cited

U.S. PATENT DOCUMENTS

| 8,401,339 B1* | 3/2013 | Anderson | G06K 9/36 382/298 |
| 2015/0350619 A1* | 12/2015 | Nakai | G09G 3/36 348/624 |
| 2017/0214885 A1 | 7/2017 | Xu et al. | |

FOREIGN PATENT DOCUMENTS

| CN | 103269416 A | 8/2013 |
| CN | 105704407 A | 6/2016 |

OTHER PUBLICATIONS

International Search Report and Written Opinion dated Sep. 25, 2017 in PCT/CN2017/089764.
1st Office Action dated Aug. 28, 2018 in CN201610695970.7.

\* cited by examiner

*Primary Examiner* — Xiao M Wu
*Assistant Examiner* — Scott E Sonners
(74) *Attorney, Agent, or Firm* — Syncoda LLC; Feng Ma

(57) ABSTRACT

A display control device is disclosed herein, which includes a plurality of data generating chips and a plurality of data processing chips, corresponding to one another in a one-to-one relationship. The plurality of data generating chips are configured to receive an image signal. The image signal includes a plurality of image region signals, each corresponding to a different region of an image frame. Each data generating chip is configured to receive, and to conduct data processing to, at least one image region signal to generate image region data, and to send the image region data to a corresponding data processing chip. Each data processing chip is configured to conduct image processing to the image
(Continued)

region data from a corresponding data generating chip to generate an image output signal, and to output the image output signal. On this basis, a display method and a display apparatus are also disclosed.

17 Claims, 9 Drawing Sheets

(52) U.S. Cl.
CPC ... *G09G 2300/026* (2013.01); *G09G 2310/04* (2013.01); *G09G 2352/00* (2013.01); *G09G 2360/06* (2013.01); *G09G 2360/121* (2013.01)

(58) Field of Classification Search
CPC ....... G06T 2207/20028; G06T 2210/52; G06T 7/11; G06T 3/4053; G06T 2207/10016; G06T 2207/20221; G09G 2370/12; G09G 5/005; G09G 2340/0407; G09G 2360/06; G09G 2350/00; G09G 2352/00; G09G 5/363; G09G 2300/026; G09G 2310/04; H04N 7/015; H04N 9/646; H04N 7/0125; H04N 19/176; H04N 19/119
See application file for complete search history.

DISPLAY CONTROL DEVICE, DISPLAY CONTROL METHOD, AND DISPLAY APPARATUS

CROSS-REFERENCE TO RELATED APPLICATION

The present application claims priority to Chinese Patent Application No. 201610695970.7 filed on Aug. 19, 2016, the disclosure of which is hereby incorporated by reference in its entirety.

TECHNICAL FIELD

The present disclosure relates generally to the field of display technologies, and more specifically to a display control device, a display method, and a display apparatus.

BACKGROUND

With the development of high-resolution display technologies, the resolutions of liquid crystal display (LCD) panels have become higher and higher, and correspondingly the demand for the system signal processing capabilities has also become higher and higher.

At present time, for the latest ultra-high resolution display screens (i.e., display screens with resolutions equal to or higher than 8K4K), in order to achieve an ultra-high resolution display, it is required for the system to have a capability of processing a large amount of data. The application-specific integrated circuit (ASIC) chips, however, do not have the capability of processing a large amount of data, which consequently cannot be applied in achieving the ultra-high resolution display.

In existing technologies, only field-programmable gate array (FPGA) can have the capability for achieving the ultra-high resolution display. An FPGA chip is typically employed in a conventional ultra-high resolution display system to thereby achieve the ultra-high resolution display, i.e., an algorithm for ultra-high resolution display is realized through an FPGA chip.

Because the algorithm for ultra-high resolution display is very complicated, the processing workload is quite high, and thus the logic resources it demands are very high. As such when an FPGA chip is utilized to achieve an ultra-high resolution display, a high-profile FPGA chip with a large amount of resources shall be selected. Yet the associated cost is very high, which is disadvantageous to the large quantity-manufacturing.

SUMMARY

The present disclosure provides a display control device, a display control method and a display apparatus, aiming at reducing the cost of chip usage.

In a first aspect, a display control device is disclosed.

The display control device includes a plurality of data generating chips and a plurality of data processing chips, which correspond to one another in a one-to-one relationship.

The plurality of data generating chips are configured to receive an image signal which comprises a plurality of image region signals. Each image region signal corresponds to a different region of an image frame.

Each data generating chip is configured to receive, and to conduct data processing to, at least one image region signal to generate image region data, and to send the image region data to a corresponding data processing chip.

Each data processing chip is configured to conduct image processing to the image region data from a corresponding data generating chip to generate an image output signal, and to output the image output signal.

According to some embodiments of the display control device, each data generating chip includes a splitting circuit, an up-scaling circuit, a gating circuit, and an output circuit. The splitting circuit is configured to split the at least one image region signal into a plurality of splitted image region signals, and to send one splitted image region signal to the up-scaling circuit; the up-scaling circuit is configured to conduct an up-scaling processing to the one splitted image region signal to thereby generate, and to send to the gating circuit, an up-scaled image region signal; the gating circuit is configured to enable the up-scaled image region signal with a set image format, and then to send the up-scaled image region signal that is enabled to the output circuit; and the output circuit is configured to conduct a signal conversion to the up-scaled image region signal to thereby generate, and to send to a corresponding data processing chip, the image region data.

In these above mentioned embodiments of the display control device, each data generating chip can be further configured to receive at least one edge pixel signal corresponding to the at least one image regional signal. Each data generating chip can further include a memory control circuit, which is configured to combine the at least one image regional signal and the at least one edge pixel signal to thereby obtain combination-treated image region signal, to conducting data processing to the combination-treated image sub-signal to thereby generate the image region data, and then to send the image region signal to the splitting circuit.

In the display control device, the plurality of data generating chips can include a first data generating chip and at least one second data generating chip. The first data generating chips can include a receiving port, which is configured to receive, and to send to a first splitting circuit thereof, the at least one image region signal. The first splitting circuit can include a plurality of channels, and is configured to send a first splitted image region signal to the up-scaling circuit in the first data generating chip, and to send one second splitted image region signal to a second splitting circuit in one of the at least one second data generating chip via one of the plurality of channels.

In the display control device, each generating chip can include at least one receiving port, which is configured to receive, and to send to a splitting circuit thereof, the at least one image region signal.

The display control device can further include at least one signal generating circuit, which is configured to receive an image input signal, to segment the image input signal into, and to send to the plurality of data generating chips, the plurality of image region signals.

In the display control device as mentioned above, the at least one signal generating circuit can consist of one signal generating circuit, which is configured to receive the image input signal, to segment the image input signal into, and to send to one of the plurality of data generating chips, the plurality of image region signals.

In the display control device as mentioned above, a number of the at least one signal generating circuit can be more than one, and each data generating chip corresponds to one or more of the at least one signal generating circuit.

In the display control device as mentioned above, the at least one signal generating circuit can be configured to receives the image input signal via HDMI or SoC.

According to some embodiments of the display control device, each data processing chip includes a receiving circuit, an enhancing circuit, a pixel processing circuit, a memory controlling circuit, and an outputting circuit. The receiving circuit is configured to receive the image region data from a corresponding data generating chip, to cache the image region data, to convert cached image region data into, and to send to the enhancing circuit, parallel signals; the enhancing circuit is configured to conduct image effect enhancement to the parallel signals, and to send enhanced parallel signals to the pixel processing circuit; the pixel processing circuit is configured to conduct pixel processing to the enhanced parallel signals, and then to send processed parallel signals to the memory controlling circuit; the memory controlling circuit is configured to conduct image format conversion to the processed parallel signals to obtain a to-be-outputted signal, and then to output the to-be-outputted signal to the outputting circuit; and the outputting circuit is configured to conduct format conversion to the to-be-outputted signal to generate an image output signal, and then to send the image output signal to a time sequence controller.

In the display control device as described above, each data processing chip can further include an asynchronous FIFO, which is configured to write the to-be-outputted signal from the memory controlling circuit under control of a local clock and to output the to-be-outputted signal to the outputting circuit. The asynchronous FIFO can be configured to include a same synchronous clock such that the to-be-outputted signal can be outputted to the outputting circuit under control of the same synchronous clock.

Herein the asynchronous FIFO can be a crystal oscillator synchronous FIFO.

In the display control device, the plurality of data processing chips can include a first data processing chip and at least one second data processing chip. The first data processing chip comprises a calculation circuit, which is configured to receive a second to-be-outputted signal sent by each of the at least one second data processing chip, to generate a brightness control signal based on a first to-be-outputted signal generated by the first data processing chip and the second to-be-outputted signal sent by the each of the at least one second data processing chip, and to output the brightness control signal to a controller, such that the controller can adjust a brightness of a backlight source according to the brightness control signal.

In any of the embodiments of the display control device as described above, each data generating chips can be an FPGA chip, and each data processing chip can also be an FPGA chip.

In any of the embodiments of the display control device as described above, a number of the data generating chips is two, and a number of the data processing chips is two.

In a second aspect, the present disclosure further provides a display apparatus. The display apparatus includes a display panel, and a display control device according to any of the embodiments of the display control device as described above. The display panel is configured to receive the image output signal from the display control device.

In a third aspect, the present disclosure further provides a display control method. The display control method employs a display control device, which includes a plurality of data generating chips and a plurality of data processing chips, and the plurality of data generating chips and the plurality of data processing chips correspond to one another in a one-to-one relationship. The display control method includes the following steps:

each data generating chip conducting data processing to at least one image region signal to thereby generate, and to send to a corresponding data processing chip, image region data, wherein each image region signal corresponds to a different region of an image frame; and each data processing chip conducting image processing to the image region data to thereby generate an image output signal, and to output the image output signal.

According to some embodiments, prior to the step of each data generating chip conducting data processing to at least one image region signal to thereby generate, and to send to a corresponding data processing chip, image region data, the display control method further includes a step of:

each data generating chip receiving the at least one image region signal and at least one edge pixel signal corresponding to the at least one image region signal.

Accordingly, the step of each data generating chip conducting data processing to at least one image region signal to thereby generate, and to send to a corresponding data processing chip, image region data includes sub-steps of:

combining the at least one image region signal and the at least one edge pixel signal to thereby obtain a combination-treated image region signal; and conducting the data processing to the combination-treated image region signal to thereby generate the image region data.

In the display control method as described above, the sub-step of combining the at least one image region signal and the at least one edge pixel signal to thereby obtain a combination-treated image region signal includes:

combining each image sub-signal and edge pixel signals of each another image sub-signal neighboring to the each image sub-signal to thereby generate the combination-treated image region signal.

The present disclosure has the following beneficial effects:

In the display control device, the display control method, and the display apparatus as described above, the display control device comprises at least two data generating chips and at least two data processing chips, wherein each data processing chip corresponds to each data generating chip. Through a segmented processing to image signals by means of multiple data generating chips and multiple data processing chips, the image processing by chips having a relatively low cost can be achieved, which can ultimately lead to a reduced cost in the chip usage.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

Figure 1:
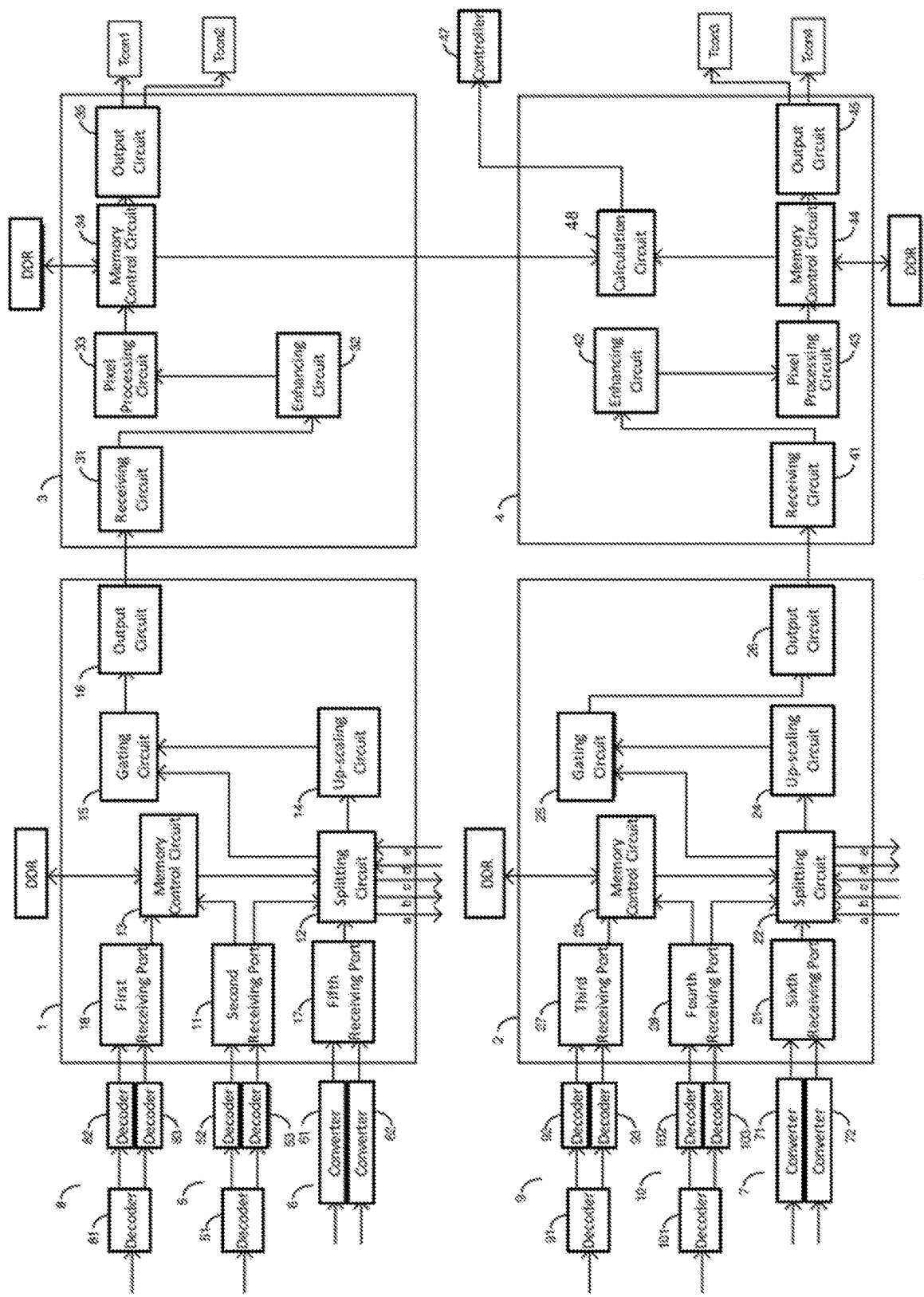
FIG. 1 is a structural diagram of a display control device according to some embodiments of the present disclosure.

FIG. 1 is a structural diagram of the display control device according to some embodiments of the present disclosure.

As shown in FIG. 1, the display control device comprises: at least two data generating chips and at least two data processing chips, wherein each data processing chip corresponds to each data generating chip.

Each data generating chip is configured to conduct data processing to at least one corresponding image region signal to generate corresponding image region data, and then to send the image region data to a corresponding data processing chip. The image region signals are configured to display different regions in an image frame. Each data processing chip is configured to conduct image processing to the image region data to generate image output signal, and then to output the image output signal.

Herein each image region signal corresponds to, and is configured to display, one region of an image frame, and all image region signals together can display the whole image frame. Thus each image region signal can be utilized to display a different region in the image frame.

According to some embodiments of the present disclosure, the display control device comprises two data generating chips and two data processing chips. In the following, the display control device will be described in detail with an embodiment having two data generating chips and two data processing chips as an illustrating example.

In the above mentioned embodiment having two data generating chips and two data processing chips, the cost can be reduced while the calculation speed can still be ensured.

In the above mentioned embodiment of the display control device, the two data generating chips are respectively a data generating chip 1 and a data generating chip 2, and the two data processing chips are respectively a data processing chip 3 and a data processing chip 4. The data generating chip 1 corresponds to the data processing chip 3, and the data generating chip 2 corresponds to the data processing chip 4.

In this embodiment the display control device, each of the two data generating chips is an FPGA chip, and each of the data processing chips is an FPGA chip.

In the following, the above mentioned embodiment the display control device will be described with an example where the display control device controls three types of image display signals.

The above mentioned three types of image display signals include signals with a resolution of 3840×2160@60 Hz (4K×2K@60 Hz) employing a high definition multimedia interface (HDMI) 2.0 transmission, signals with a resolution of 3840×2160@60 Hz (4K×2K@60 Hz) employing a system on chip (SoC) transmission, and signals with a resolution of 7680×4320@60 Hz (8K×4K@60 Hz) employing an HDMI 2.0 transmission. Herein, the @60 Hz means that the frequency of signals is 60 Hz.

A first mode (Mode 1) is the 4K×2K signal mode employing the HDMI 2.0 transmission.

Herein, the display control device further comprises a signal generating circuit 5 corresponding to the data generating chip 1. The signal generating circuit 5 is configured to receive an image input signal, to segment the image input signals into a plurality of image region signals, and to send the plurality of image region signals to the corresponding data generating chip 1.

The data generating chip 1 that corresponds to the signal generating circuit 5 is further configured to send the image region signals corresponding to the other data generating chip 2 to the other data generating chips 2. In mode 1, there is only one signal generating circuit, which is the signal generating circuit 5.

Figure 2:
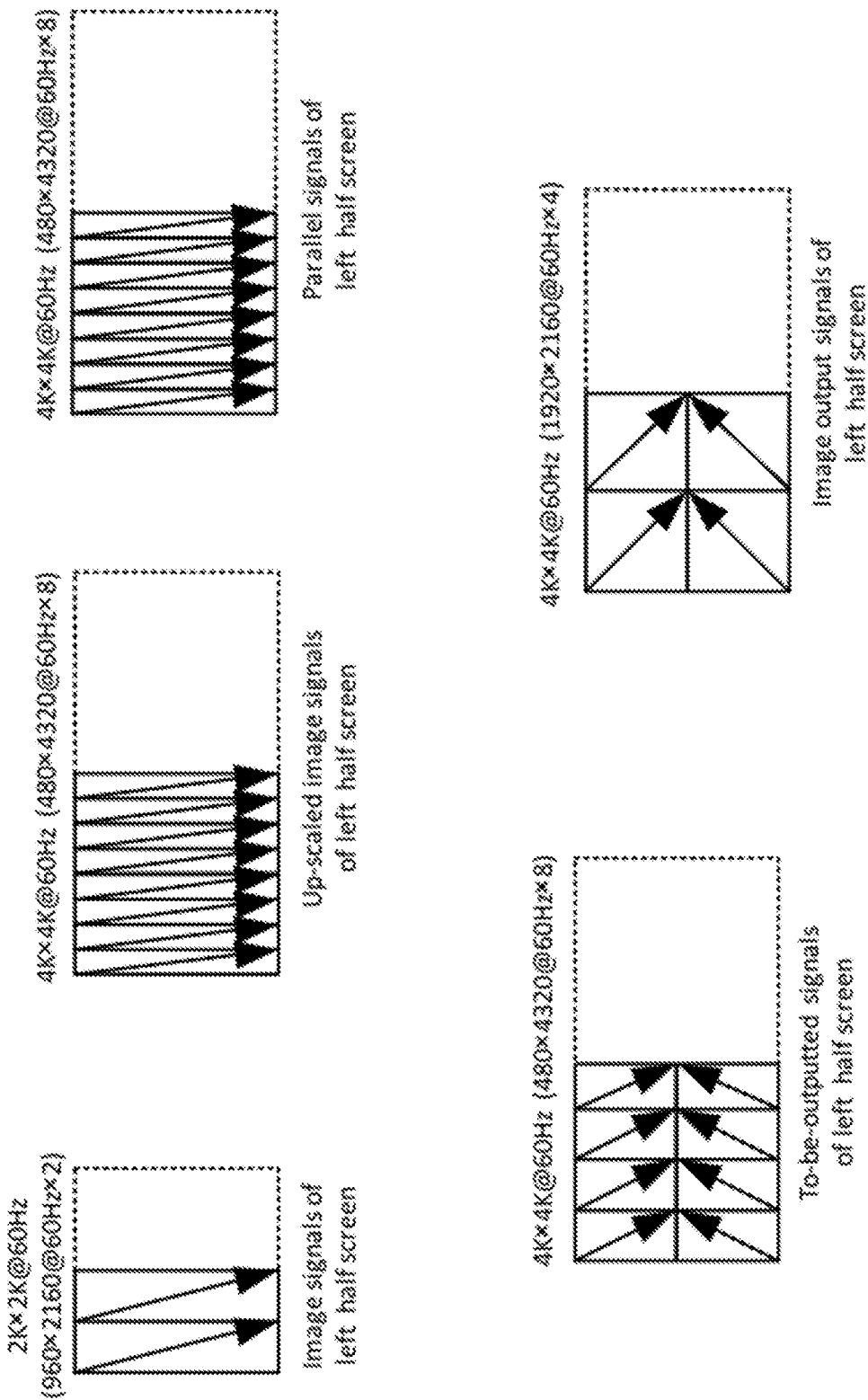
FIG. 2 is a diagram illustrating the image format of each of the left half screen signals when the display control device as shown in FIG. 1 is in mode 1.

FIG. 2 is a diagram illustrating the image format of the each of the signals of the left half screen when the display control device as shown in FIG. 1 is in mode 1. Specifically, as shown in FIG. 1 and FIG. 2, the signal generating circuit 5 comprises a decoder 51, which is configured to segment the image input signals into two image region signals.

Herein preferably, these two image region signals are respectively image signals of the left half screen and image signals of the right half screen. Correspondingly, the two image region data are respectively image data of the left half screen and image data of the right half screen; and the two image output signals are respectively image output signals of the left half screen and image output signals of the right half screen.

Herein, the image input signals can be outputted to the signal generating circuit 5 through a 4k player. The 4k player can be a blue-ray player or a person computer (PC). The 4k player and the signal generating circuit 5 can be connected to each other by means of an HDMI 2.0 cable.

The image input signals comprise signals with a resolution of 4K×2K@60 Hz employing the HDMI 2.0 transmission, then the resolution of each of the image region signals is 2K×2K@60 Hz. As shown in FIG. 2, the image format of the image region signals is 960×2160@60 Hz×2, where each arrow represents 960×2160@60 Hz.

The signal generating circuit 5 further comprises a decoder 52 and a decoder 53. The decoder 52 is configured to convert the image signals of the left half screen into a TTL-format image signals of the left half screen, and then to send the TTL-format image signals of the left half screen to the data generating chip 1. The decoder 53 is configured to convert the image signals of the right half screen into a TTL-format image signals of the right half screen, and then to send the TTL-format image signals of the right half screen to the data generating chip 1.

Specifically, the data generating chip 1 can comprise a second receiving port (Port2 Video Rx) 11, a splitting circuit (Split SCH) 12, an up-scaling circuit (Up-scaler) 14, a gating circuit (Schedual Mux) 15, and an output circuit (V-By-One 16 Lanes Tx) 16.

The second receiving port 11 is coupled to the signal generating circuit 5, and is configured to receive the TTL-format image signals of the left half screen sent by the decoder 52 and the TTL-format image signals of the right half screen sent by the decoder 53, and then to send the image signals of the left half screen and the image signals of the right half screen to the splitting circuit 12.

The splitting circuit 12 is configured to cache the image signals of the left half screen in the chip, and then to send the image signals of the left half screen to the up-scaling circuit 14, and is also configured to send the image signals of the right half screen to the data generating chip 2. The splitting circuit 12 comprises a plurality of channels. As shown in FIG. 1, the plurality of channels are respectively channel a, channel b, channel c, channel d, and channel e. In mode 1, the splitting circuit 12 can send the image signals of the right half screen to the data generating chip 2 through channel b.

The up-scaling circuit 14 is configured to conduct an upscaling processing to the image signals of the left half screen to thereby obtain up-scaled image signals of the left half screen, and then to send the up-scaled image signals of the left half screen to the gating circuit 15. Herein, the resolution of the image signals of the left half screen is 2K×2K@60 Hz.

As shown in FIG. 2, an image format of the image signals of the left half screen is 960×2160@60 Hz×2, the resolution of the up-scaled image signals of the left half screen is 4K×4K@60 Hz. As shown in FIG. 2, the image format of the up-scaled image signals of the left half screen is 480×4320@60 Hz×8, where each arrow represents 480×4320@60 Hz.

The gating circuit 15 is configured to enable the up-scaled image signals of the left half screen with a set image format, and then to send the up-scaled image signals of the left half screen that is enabled to the output circuit 16. Herein, the set image format is 480×4320@60 Hz×8, thereby the up-scaled image signals of the left half screen can be enabled.

The output circuit 16 is configured to conduct a signal conversion to the up-scaled image signals of the left half screen according to the V-By-One protocol to generate image data of the left half screen. Herein, the image data of the left half screen is V-By-One protocol data.

Specifically, the data processing chip 3 can comprise a receiving circuit (V-By-One 16 Lanes Tx) 31, an enhancing circuit (Enhancer) 32, a pixel processing circuit (RGB Processor) 33, a memory controlling circuit (Memory Controller) 34, and an outputting circuit (V-By-One 16 Lanes Tx)35.

The receiving circuit 31 is configured to receive the image data of the left half screen, to cache the image data of the left half screen in the chip, to convert the cached image data of the left half screen to parallel signals of the left half screen, and then to send the parallel signals of the left half screen to the enhancing circuit 32. Herein, a resolution of the parallel signals of the left half screen is 4K×4K@60 Hz. As shown in FIG. 2, the image format of the parallel signals of the left half screen is 480×4320@60 Hz×8, where each arrow represents 480×4320@60 Hz.

The enhancing circuit 32 is configured to conduct an image effect enhancement to the parallel signals of the left half screen, and then to send enhanced parallel signals of the left half screen to the pixel processing circuit 33.

The pixel processing circuit 33 is configured to conduct a pixel processing to the enhanced parallel signals of the left half screen, and then to send processed parallel signals of the left half screen to the memory controlling circuit 34. Herein, the pixel processing is purported to support an adjustment and control of the image color.

The memory controlling circuit 34 is configured to conduct an image format conversion to the processed parallel signals of the left half screen to obtain to-be-outputted signals of the left half screen under control of a local clock outputted by the double data rate (DDR), and then to send the to-be-outputted signals of the left half screen to the data processing chip 4 and the outputting circuit 35. Herein, the image format of the to-be-outputted signals of the left half screen is 960×2160@60 Hz×8, where each arrow represents 960×2160@60 Hz. The image format conversion of the parallel signals of the left half screen by the memory controlling circuit 34 is to make them compatible to the image format of a time sequence controller Tcon.

The outputting circuit 35 is configured to convert a format conversion of the to-be-outputted signals of the left half screen to generate image output signals of the left half screen, and then to send the image output signals of the left half screen to the time sequence controller.

Herein, the format conversion is the V-By-One protocol signal conversion, and the image output signals of the left half screen is V-By-One protocol data. As shown in FIG. 2, the image format of the image output signals of the left half screen is 1920×2160@60 Hz×4, where each arrow represents 1920×2160@60 Hz.

Specifically, the outputting circuit 35 respectively outputs the image output signals of the left half screen to a time sequence controller Tcon1 and a time sequence controller Tcon2. For example, the outputting circuit 35 can output the image output signals of a top left half screen to the time sequence controller Tcon1, and output the image output signals of a bottom left half screen to the time sequence controller Tcon2. [[Other arrangements are also possible. There can be more than two sequence controllers, which can correspond to one sub-region of the left half screen. There are no limitations herein.]]

Figure 3:
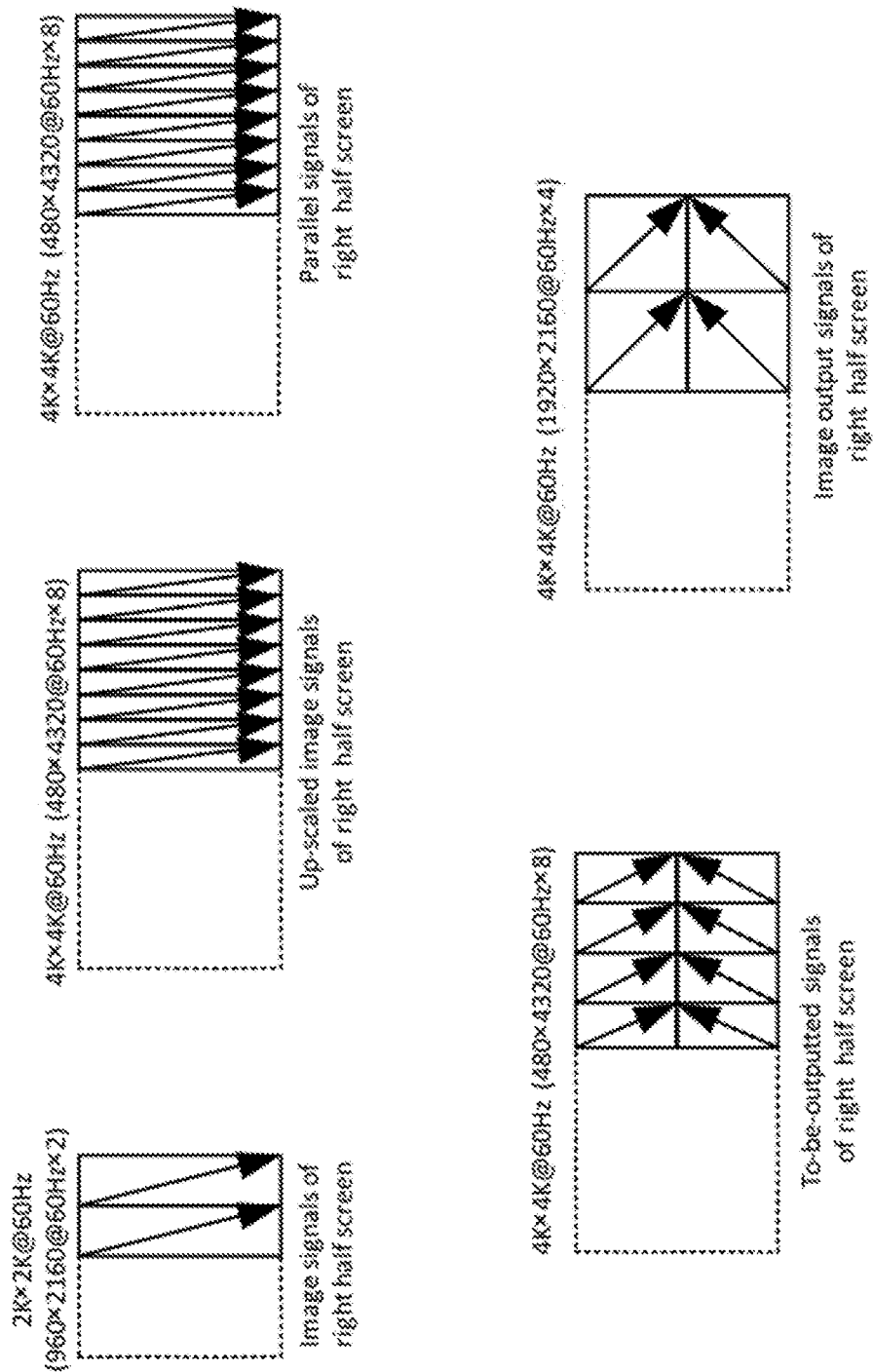
FIG. 3 is a diagram illustrating the image format of each of the right half screen signals when the display control device as shown in FIG. 1 is in mode 1.

FIG. 3 is a diagram illustrating the image format of the each of the signals of the right half screen when the display control device as shown in FIG. 1 is in mode 1.

Specifically, as shown in FIG. 1 and FIG. 3, the data generating chip 2 can comprise a splitting circuit (Split SCH) 22, an up-scaling circuit (Up-scaler) 24, a gating circuit (Schedual Mux) 25, an output (V-By-One 16 Lanes Tx) circuit 26, and a memory control circuit (Memory Controller) 23.

The splitting circuit 22 is configured to receive the image signals of the right half screen sent by the splitting circuit 12, and then to send the image signals of the right half screen to the up-scaling circuit 24. The splitting circuit 22 comprises a plurality of channels. As illustrated by FIG. 1, the plurality of channels in the splitting circuit 22 are respectively channel a, channel b, channel c, channel d and channel e, and under mode 1, the splitting circuit 22 can receive the image signals of the right half screen through channel b.

The up-scaling circuit 24 is configured to conduct an up-scaling processing to the signals of the right half screen to thereby obtain up-scaled image signals of the right half screen, and then to send the up-scaled image signals of the right half screen to the gating circuit 25. Herein, the resolution of the image signals of the right half screen is 2K×2K@60 Hz. As shown in FIG. 3, the image format of the image signals of the right half screen is 960×2160@60 Hz×2, the resolution of the up-scaled image signals of the right half screen is 4K×4K@60 Hz, and the image format of the up-scaled image signals of the right half screen is 480×4320@60 Hz×8, where each arrow represents 480×4320@60 Hz.

The gating circuit 25 is configured to enable the up-scaled image signals of the right half screen with a set image format, and then to send the up-scaled image signals of the right half screen that are enabled to the output circuit 26. Herein, the set image format is 480×4320@60 Hz×8, thereby the up-scaled image signals of the right half screen can be enabled.

The output circuit 26 is configured to conduct a signal conversion processing to the up-scaled image signals of the right half screen according to the V-By-One protocol to generate the image data of the right half screen. Herein, the image data of the right half screen is V-By-One protocol data.

Specifically, the data processing chip 4 can comprise a receiving circuit (V-By-One 16 Lanes Tx) 41, an enhancing circuit (Enhancer) 42, a pixel processing circuit (RGB Processor) 43, a memory controlling circuit (Memory Controller) 44, and an outputting circuit (V-By-One 16 Lanes Tx) 45.

The receiving circuit 41 is configured to receive the image data of the right half screen, to cache the image data of the right half screen in the chip, to convert the cached image data of the right half screen into parallel signals of the right half screen, and then to send the parallel signals of the right half screen to the enhancing circuit 42. Herein, a resolution of the parallel signals of the right half screen is 4K×4K@60 Hz. As shown in FIG. 3, the image format of the parallel signals of the right half screen is 480×4320@60 Hz×8, where each arrow represents 480×4320@60 Hz.

The enhancing circuit 42 is configured to conduct an image effect enhancement to the parallel signals of the right half screen, and after the image effect enhancement, to send the enhanced parallel signals of the right half screen to the pixel processing circuit 43.

The pixel processing circuit 43 is configured to conduct pixel processing to the enhanced parallel signals of the right half screen, and then to send the processed parallel signals of the right half screen to the memory controlling circuit 44. Herein, the pixel processing is purported to support an adjustment and control of the image color.

The memory controlling circuit 44 is configured to conduct image format conversion to the processed parallel signals of the right half screen to obtain to-be-outputted signals of the right half screen under control of a local clock in a double data rate (DDR) output, and then to output the to-be-outputted signals of the right half screen to the outputting circuit 45.

Herein, the image format of the to-be-outputted signals of the right half screen is 960×2160@60 Hz×8, where each arrow represents 960×2160@60 Hz. The image format conversion of the processed parallel signals of the right half screen by the memory controlling circuit 44 is to make the processed parallel signals of the right half screen compatible to the image format of the time sequence controller Tcon.

The outputting circuit 45 is configured to conduct format conversion to the to-be-outputted signals of the right half screen to generate image output signals of the right half screen, and then to send the image output signals of the right half screen to the time sequence controller. Herein, the format conversion is the V-By-One protocol signal conversion, and the image output signals of the right half screen is V-By-One protocol data. As shown in FIG. 3, the image format of the image output signals of the right half screen is 1920×2160@60 Hz×4, where each arrow represents 1920×2160@60 Hz.

Specifically, the outputting circuit 45 respectively outputs the image output signals of the right half screen to a time sequence controller Tcon3 and a time sequence controller Tcon4. For example, the outputting circuit 45 can send the image output signals of a top right half screen to the time sequence controller Tcon3, and send the image output signals of a bottom right half screen to the time sequence controller Tcon4.

It is noted that there are no limitations herein, and other arrangements are also possible. For example, there can be more than two sequence controllers, which can correspond to one sub-region of the left half screen.

In summary, because the resolution of the image output signals of the left half screen outputted by the data processing chip 3 is 4K×4K@60 Hz, and the resolution of the image output signals of the right half screen outputted by the data processing chip 4 is 4K×4K@60 Hz, the resolution of the image output signals of an image frame is 8K×4K@60 Hz.

Figure 4:
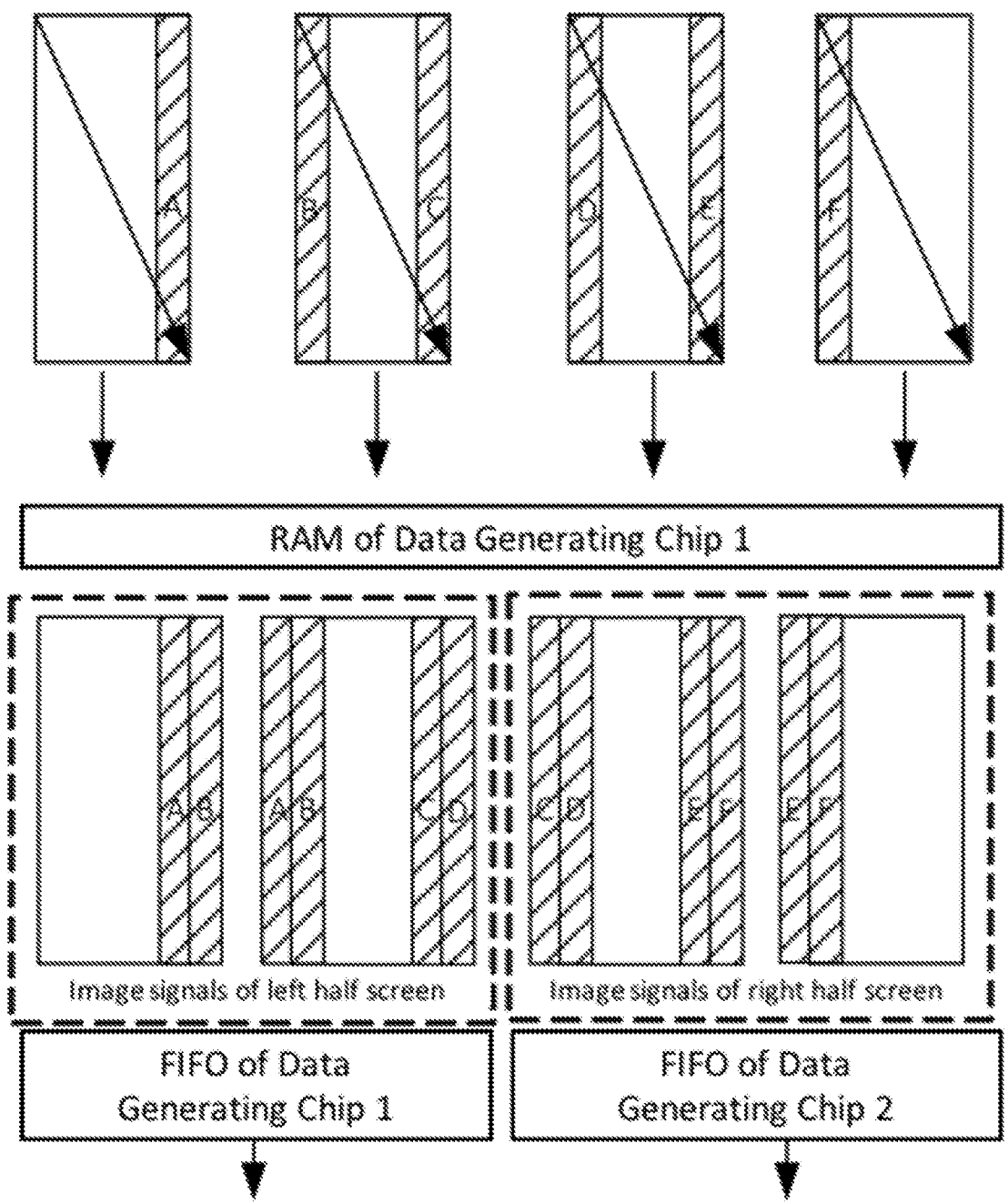
FIG. 4 is a diagram illustrating the processing of the edge pixel of the image region signal when the display control device as shown in FIG. 1 is in mode 1.

FIG. 4 is a diagram illustrating a processing of edge pixels of the image region signals when the display control device in FIG. 1 is under Mode 1.

As shown in FIG. 1, FIG. 2, and FIG. 4, each image region signal comprises a plurality of image sub-signals, the data generating chip 1 corresponding to the signal generating circuit 5 is specifically configured to obtain the edge pixel signals of each image sub-signal, to combine the each image sub-signal and the edge pixel signals of a neighboring image sub-signal to thereby generate each combination-treated image sub-signal, and to send the image sub-signals corresponding to other data generating chips (i.e. data generating chip 2 in this embodiment) to the other data generating chips (i.e. data generating chip 2 in this embodiment).

For example, the image signal of the left half screen in FIG. 2 comprises two image sub-signals, and the resolution of each of the two image sub-signals is 960×2160@60 Hz, i.e., each arrow in FIG. 2 represents one image sub-signal.

The image signal of the right half screen in FIG. 3 comprises two image sub-signals, the resolution of each of the two image sub-signals is 960×2160@60 Hz, i.e., each arrow in FIG. 3 represents one image sub-signal.

As shown in FIG. 4, a first image sub-signal of the image signal of the left half screen comprises an edge pixel signal A, and a second image sub-signal of the image signals of the left half screen comprises edge pixel signals B and C. Herein, because the left edge of the first image sub-signal is the original edge of the image frame and not an edge formed after signal segmentation, thus in this embodiment, there is no need to consider the left edge of the first image sub-signal.

As shown in FIG. 4, a first image sub-signal of the image signal of the right half screen comprises edge pixel signals D and E, and a second image sub-signal of the image signals of the right half screen comprises an edge pixel signal F. Herein, because the right edge of the second image sub-signal is the original edge of the image frame and not an edge formed after signal segmentation, thus in this embodiment, there is no need to consider the right edge of the second image sub-signal.

The RAM of the data generating chip 1 is configured to combine the first image sub-signal with the edge pixel signal B of the second image sub-signal of the image signals of the left half screen, then the edge pixel signal B of the combination-treated first image sub-signal is located at an outer side of the edge pixel signal A.

The RAM of the data generating chip 1 is configured to combine the second image sub-signal with the edge pixel signal B of the first image sub-signal of the image signals of the left half screen and the edge pixel signal D of the first image sub-signal of the image signals of the right half screen, then the edge pixel signal A of the combination-treated second image sub-signal is located at an outer side of the edge pixel signal B, and the edge pixel signal D of the combination-treated second image sub-signal is located at an outer side of the edge pixel signal C.

In summary, the image signals of the left half screen after the combination processing (i.e. combination-treated image signals of the left half screen) comprise the combination-treated first image sub-signal and the combination-treated second image sub-signal. The RAM of the data generating chip 1 is configured to send the combination-treated image signals of the left half screen to the splitting circuit 12 of the data generating chip 1.

The RAM of the data generating chip 1 is configured to combine the second image sub-signal and the edge pixel signal E of the first image sub-signal of the image signals of the right half screen, then the edge pixel signal E of the combination-treated first image sub-signal is located at an outer side of the edge pixel signal F.

The RAM of the data generating chip 1 is configured to combine the second image sub-signal with the edge pixel signal F of the first image sub-signal of the image signals of the right half screen and the edge pixel signal C of the first image sub-signal of the left half screen, then the edge pixel signal C of the combination-treated second image sub-signal is located at an outer side of the edge pixel signal D, and the edge pixel signal E of the combination-treated second image sub-signal is located at an outer side of the edge pixel signal F.

In summary, the image signal of the right half screen after the combination processing (i.e. combination-treated image signal of the right half screen) comprise the combination-treated first image sub-signal and the combination-treated second image sub-signal.

The splitting circuit 12 of the data generating chip 1 is configured to send the combination-treated first image sub-signal and the combination-treated second image sub-signal in the image signal of the right half screen to the data generating chip 2 through channel b, and the splitting circuit 22 of the data generating chip 2 is configured to receive the combination-treated first image sub-signals and the combination-treated second image sub-signal in the image signal of the right half screen through channel b.

The splitting circuit 12 of the data generating chip 1 is configured to send the combination-treated image signals of the left half screen through the FIFO of the data generating chip 1 to the up-scaling circuit 14.

The splitting circuit 22 of the data generating chip 2 is configured to send the combination-treated image signals of the right half screen through the FIFO of the data generating chip 2 to the up-scaling circuit 24.

Herein, the FIFO of the data generating chip 1 and the FIFO of the data generating chip 2 can be crystal oscillator synchronous FIFO.

Preferably, the data of the image signals of the left half screen and the data of the image signals of the right half screen can be completely aligned through effective mark location by means of a crystal oscillator synchronous FIFO in this embodiment. Herein, the effective mark location signal is sent into each of the data generating chips along with the image region signals. By this approach, gaps at the edges of the images due to pixel missing after the image signal segmentation can be effectively avoided, leading to an improved display effect.

Figure 5:
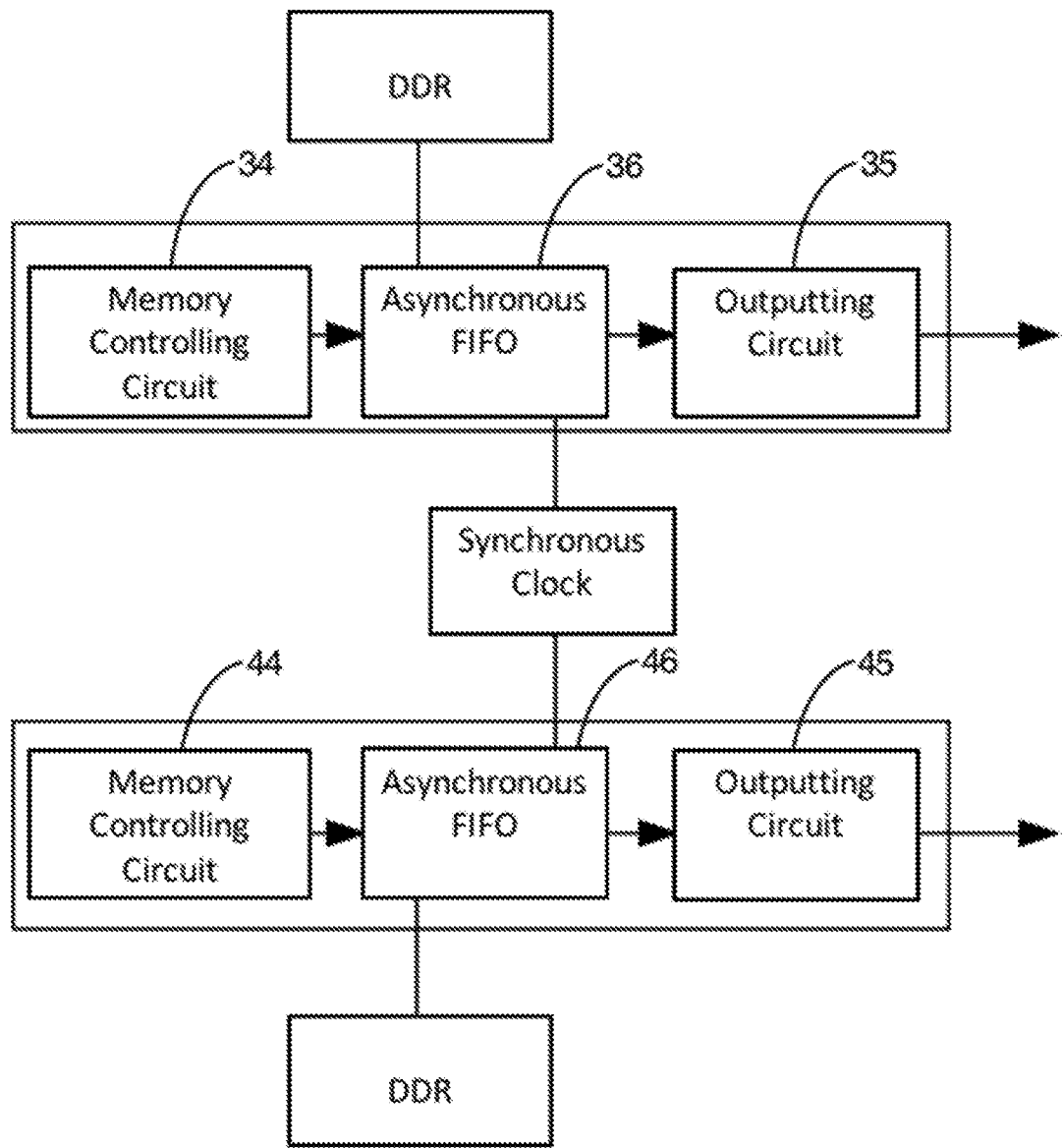
FIG. 5 is a diagram illustrating the multi-chip synchronous processing of the display control device as shown in FIG. 1.

FIG. 5 is a diagram illustrating a synchronous processing of multiple data processing chips in the display control device as shown in FIG. 1. As illustrated in FIG. 5, each of the data processing chips comprises an asynchronous FIFO. The asynchronous FIFO is configured to write to-be-outputted signals under control of a local clock, and then to output the signals under control of a synchronous clock. Herein the to-be-outputted signals are generated through conducting image data processing to the image region data, and each of the asynchronous FIFOs has a same synchronous clock.

The outputting circuit 35 is configured to conduct format conversion to the to-be-outputted signals, and to generate and image output signals.

Specifically, the data processing chip 3 further comprises an asynchronous FIFO 36. The memory controlling circuit 34 is configured to output the to-be-outputted signals of the left half screen to the asynchronous FIFO 36, and the asynchronous FIFO 36 is configured to write the to-be-outputted signals of the left half screen under the control of the local clock of the DDR output, and to output the to-be-outputted signals of the left half screen under the control of the synchronous clock. The outputting circuit 35 is configured to conduct format conversion to the to-be-outputted signals of the left half screen that have been received, and then to generate and output the image output signals of the left half screen.

Specifically, the data processing chip 4 further comprises an asynchronous FIFO 46. The memory controlling circuit 44 is configured to output the to-be-outputted signals of the right half screen to the asynchronous FIFO 46; and the asynchronous FIFO 46 is configured to write the asynchronous signals of the right half screen under the control of the local clock of the DDR output, and to output the to-be-outputted signals of the right half screen under the control of the synchronous clock. Herein, the synchronous clock of the asynchronous FIFO 36 and the synchronous clock of the asynchronous FIFO 46 is the same one. The outputting circuit 45 is further configured to conduct format conversion processing to the to-be-outputted signals of the right half screen that have been received, and then to generate and output the image output signals of the right half screen.

As such, it is ensured that the image signals can be outputted synchronously to the TCON system after processing by multiple chips.

Furthermore, each of the data processing chips is further configured to receive to-be-outputted signals sent by other data processing chips, to generate a brightness control signal according to the to-be-outputted signals sent by other data processing chips and by itself, and then to output the brightness control signal to a controller, such that the controller can adjust a brightness of a backlight source based on the brightness control signal.

As shown in FIG. 1, the data processing chip 4 is further configured to receive to-be-outputted signals sent by the data processing chip 3, to generate a brightness control signal according to the to-be-outputted signals sent by the data processing chip 3 and itself, and then to output the brightness control signal to the controller 47, such that the controller 47 can adjust the backlight of the back light source based on the brightness control signal. Herein, the brightness control signal can be a PWM signal.

Specifically, as shown in FIG. 1, the data processing chip 4 further comprises a calculation circuit 48. The calculation circuit 48 is configured to receive the to-be-outputted signals of the left half screen sent by the memory controlling circuit 34 of the data processing chip 3 and the to-be-outputted signals of the right half screen sent by the memory controlling circuit 44, to calculate out the brightness control signal based on the to-be-outputted signals of the left half screen and the to-be-outputted signals of the right half screen, and then to output the brightness control signal to the controller 47.

A second mode (Mode 2) is the 4K×2K signal mode employing the SoC transmission.

The display control device further comprises at least two signal generating circuits, each corresponding to a data generating chip. Each signal generating circuit is configured to receive a corresponding image input signal, to convert the image input signal into an image region signal, and to send the image region signal to the corresponding data generating chip.

Under Mode 2, the number of the signal generating circuits is two, i.e., including a signal generating circuit 6 and a signal generating circuit 7.

Under Mode 2, the image formats of each of the signals of the left half screen can reference to FIG. 2 and the image format of each of the signals of the right half screen can reference to FIG. 3.

As shown in FIG. 1, FIG. 2 and FIG. 3, the display control device further comprises a signal generating circuit 6 corresponding to the data generating chip 1 and a signal generating circuit 7 corresponding to the data generating chip 2. An SoC can be configured to output the image input signals to the signal generating circuit 6 and the signal generating circuit 7, and the SoC is connected to the signal generating circuit 6 and the signal generating circuit 7 via a V-By-One cable.

The signal generating circuit 6 comprises a convertor 61 and a convertor 62. The image input signal of the left half screen comprises two image input sub-signals, and the image signals of the left half screen comprise two image sub-signals.

Accordingly, the convertor 61 is configured to receive a first image input sub-signal in the image input signal of the left half screen, to convert the first image input sub-signal into the first image sub-signal, and then to send the first image sub-signal to the data generating chip 1.

The convertor 62 is configured to receive a second image input sub-signal in the image input signal of the left half screen, to convert the second image input sub-signal into the second image sub-signal, and then to send the second image sub-signal to the data generating chip 1.

Thereby the image signal of the left half screen can be sent to the data generating chip 1.

Herein, the first image input sub-signal and the second image input sub-signal are V-By-One protocol signals, and the first image sub-signal and the second image sub-signal are LVDS signals.

The signal generating circuit 7 comprises a convertor 71 and a convertor 72. The image input signal of the right half screen comprises two image input sub-signals, and the image signals of the right half screen comprise two image sub-signals.

Accordingly, the convertor 71 is configured to receive a first image input sub-signal in the image input signal of the right half screen, to convert the first image input sub-signal into the first image sub-signal, and then to send the first image sub-signal to the data generating chip 2.

The convertor 72 is configured to receive a second image input sub-signal in the image input signal of the right half screen, to convert the second image input sub-signal into the second image sub-signal, and then to send the second image sub-signal to the data generating chip 2.

Thereby the image signal of the right half screen can be sent to the data generating chip 2.

Herein, the first image input sub-signal and the second image input sub-signal are V-By-One protocol signals, and the first image sub-signal and the second image sub-signal are LVDS signals.

The image format of the image signals of the left half screen can reference to FIG. 2, and the image format of the image signals of the right half screen can reference to FIG. 3.

Specifically, the data generating chip 1 further comprises a fifth receiving port (Port5 LVDS Rx) 17. The fifth receiving port 17 is configured to receive the image signal of the left half screen sent by the signal generating circuit 6, and to send the image signal of the left half screen to the splitting circuit 12. The subsequent processing processes of the other circuits in the data generating chip 1 and the data processing chip 3 are the same as those in Mode 1, and will not be repeated herein.

Specifically, the data generating chip 2 further comprises a sixth receiving port (Port5 LVDS Rx) 21. The sixth receiving port 21 is configured to receive the image signal of the right half screen sent by the signal generating circuit 7, and to send the image signal of the right half screen to the splitting circuit 22. The subsequent processing processes of the other circuits in the data generating chip 2 and the data processing chip 4 are the same as those in Mode 1, and thus will not be repeated herein.

Figure 6:
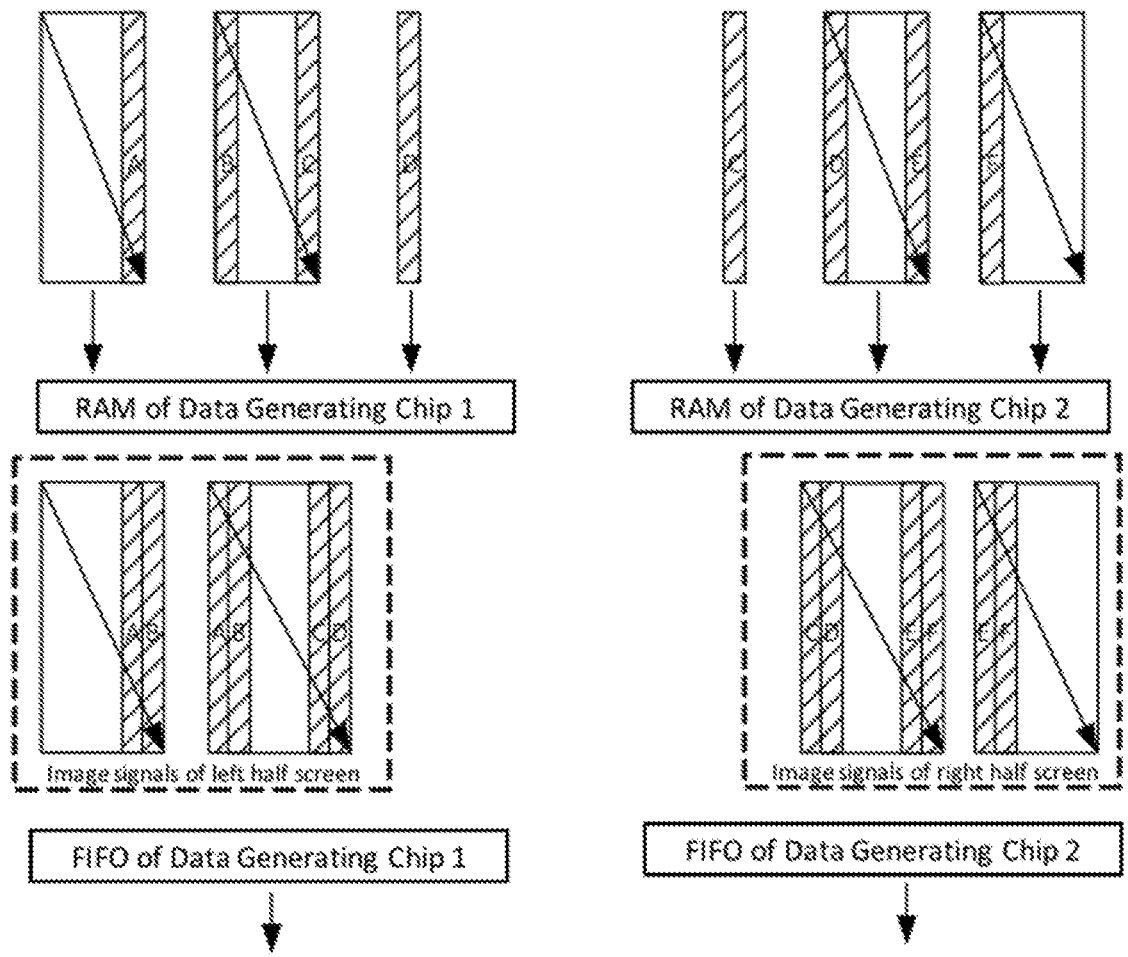
FIG. 6 is a diagram illustrating the processing of the edge pixel of the image region signal when the display control device as shown in FIG. 1 is in mode 2.

FIG. 6 is a diagram illustrating a processing of edge pixels of the image region signals when the display control device in FIG. 1 is under Mode 2.

Furthermore, as shown in FIG. 1, FIG. 2, and FIG. 6, each image region signal comprises a plurality of image sub-signals, each data generating chip is specifically configured to obtain edge pixel signals of each image sub-signal, to combine the each image sub-signal and edge pixel signals of a neighboring image sub-signal to thereby generate each combination-treated image sub-signal, and then to send the combination-treated image sub-signals to the corresponding data processing chip.

As shown in FIG. 6, a first image sub-signal of the image signals of the left half screen comprises an edge pixel signal A, and a second image sub-signal of the image signals of the left half screen comprises edge pixel signals B and C. Herein, because the left edge of the first image sub-signal is the original edge of the image frame and not an edge formed after signal segmentation, thus the left edge of the first image sub-signal needs not to be considered in this embodiment.

As shown in FIG. 6, a first image sub-signal of the image signals of the right half screen comprises edge pixel signals D and E, and a second image sub-signal of the image signals of the right half screen comprises an edge pixel signal F. Herein, because the right edge of the second image sub-signal is the original edge of the image frame and not an edge formed after signal segmentation, there is no need to consider the right edge of the second image sub-signal.

The data generating chip 2 is configured to send the edge pixel signal D of the first image sub-signal in the image signal of the right half screen to the data generating chip 1; and the data generating chip 1 is configured to send the edge pixel signal C of the second image sub-signal in the image signal of the left half screen to the data generating chip 2.

Specifically, the splitting circuit 12 of the data generating chip 1 is configured to receive the image signal of the left half screen sent by the fifth receiving port 17, and to send the edge pixel signal C of the second image sub-signal in the image signal of the left half screen to the data generating chip 2 through channel a; and the splitting circuit 22 of the data generating chip 2 is configured to receive the edge pixel signal C of the second image sub-signal in the image signal of the left half screen through channel a.

The splitting circuit 22 of the data generating chip 2 is configured to receive the image signal of the right half screen sent by the sixth receiving port 27, and to send the edge pixel signal D of the first image sub-signal in the images signal of the right half screen to the data generating chip 1 through channel e; and the splitting circuit 12 of the data generating chip 1 is configured to receive the edge pixel signal D of the first image sub-signal in the image signal of the right half screen through channel e.

The RAM of the data generating chip 1 is configured to combine the first image sub-signal and the edge pixel signal B of the second image sub-signal in the image signal of the left half screen, and as such, the edge pixel signal B of the combination-treated first image sub-signal is located at an outer side of the edge pixel signal A.

The RAM of the data generating chip 1 is configured to combine the second image sub-signal with the edge pixel signal B of the first image sub-signal in the images signal of the left half screen and the edge pixel signal D of the first image sub-signal in the image signal of the right half screen, and as such, the edge pixel signal A of the combination-treated second image sub-signal is located at an outer side of the edge pixel signal B, and the edge pixel signal D of the combination-treated second image sub-signal is located at an outer side of the edge pixel signal C.

In summary, the image signal of the left half screen after the combination processing (i.e. combination-treated image signal of the left half screen) comprises the combination-treated first image sub-signal and the combination-treated second image sub-signal. The RAM of the data generating chip 1 is configured to send the image signal of the left half screen after the combination processing (i.e. combination-treated image signal of the left half screen) to the up-scaling circuit 14 through the FIFO of the data generating chip 1.

The RAM of the data generating chip 2 is configured to combine the second image sub-signal and the edge pixel signal E of the first image sub-signal in the image signal of the right half screen, and as such, the edge pixel signal E of the combination-treated first image sub-signal is located at an outer side of the edge pixel signal F.

The RAM of the data generating chip 2 is configured to combine the second image sub-signal, the edge pixel signal F of the first image sub-signal of the image signals of the right half screen, and the edge pixel signal C of the first image sub-signal in the image signal of the left half screen, and as such, the edge pixel signal C of the combination-treated second image sub-signal is located at an outer side of the edge pixel signal D, and the edge pixel signal E of the combination-treated second image sub-signal is located at an outer side of the edge pixel signal F.

In summary, the image signals of the right half screen after the combination processing (i.e. combination-treated image signal of the right half screen) comprise the combination-treated first image sub-signal and the combination-treated second image sub-signal. The RAM of the data generating chip 2 is configured to send the image signals of the right half screen after the combination processing (i.e. combination-treated image signal of the right half screen) to the up-scaling circuit 24 through the FIFO of the data generating chip 2.

Herein, the FIFO of the data generating chip 1 and the FIFO of the data generating chip 2 are each a crystal oscillator synchronous FIFO, which ensures that the image signals of the left half screen and the image signals of the right half screen are aligned completely. By this approach, the gaps at the edges of the images due to pixel missing after the image signal segmentation can be effectively avoided, leading to an improved display effect.

A third mode (Mode 3) is the 8K×4K signal mode employing the HDMI 2.0 transmission.

The display control device further comprises a plurality of signal generating circuits, each corresponding to a data generating chip. Each signal generating circuit is configured to receive a corresponding image input signal, to convert the image input signal into an image region signal, and to send the image region signal to the corresponding data generating chip.

Under Mode 3, the number of the signal generating circuits is four, which include a signal generating circuit 5, a signal generating circuit 8, a signal generating circuit 9, and a signal generating circuit 10.

Figure 7:
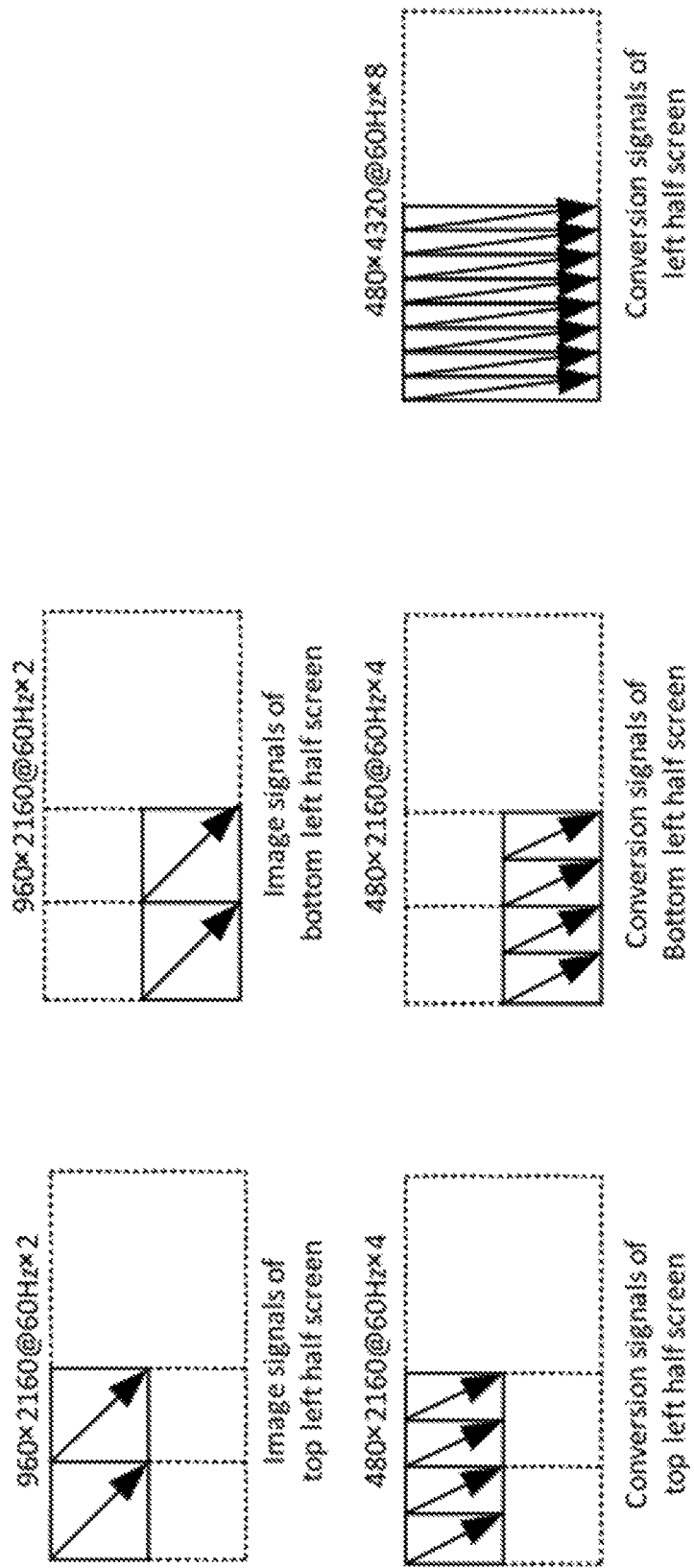
FIG. 7 is a diagram illustrating the image format of each of the left half screen signals when the display control device as shown in FIG. 1 is in mode 3.
Figure 8:
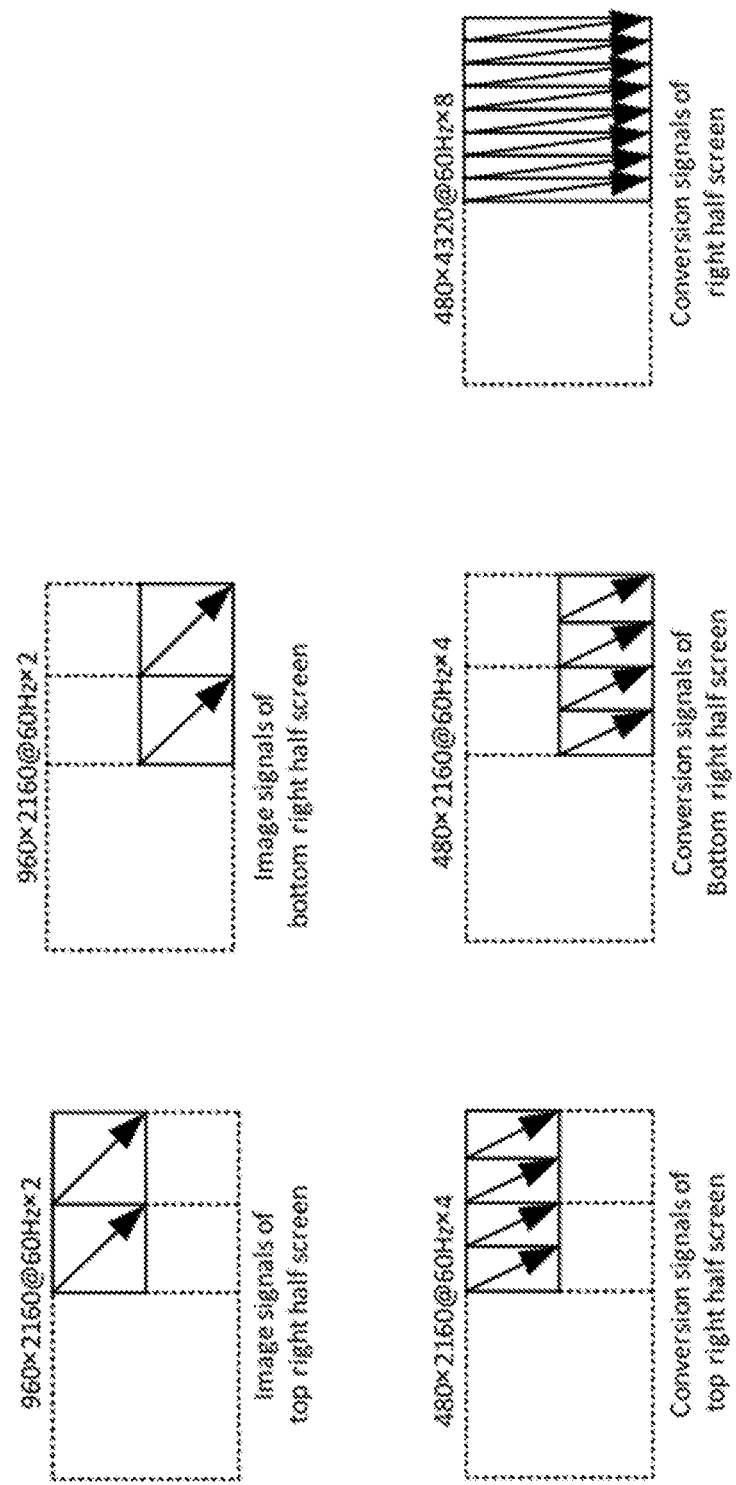
FIG. 8 is a diagram illustrating the image format of each of the right half screen signals when the display control device as shown in FIG. 1 is in mode 3.

FIG. 7 is a diagram illustrating the image format of the signals of the left half screen when the display control device is under Mode 3, and FIG. 8 is a diagram illustrating the image format of the signals of the right half screen when the display control device is under Mode 3.

Specifically, as shown in FIG. 1, FIG. 7 and FIG. 8, the display control device further comprises the signal generating circuit 5 and the signal generating circuit 8, which correspond to the data generating chip 1, and the signal generating circuit 9 and the signal generating circuit 10 which correspond to the data generating chip 2.

Herein, an 8K player can respectively output four image input signals to the signal generating circuit 5, the signal generating circuit 8, the signal generating circuit 9, and the signal generating circuit 10. The 8K player can be connected to the signal generating circuit 5, the signal generating circuit 8, the signal generating circuit 9, and the signal generating circuit 10 through HDMI 2.0 cables, and as such, the image input signals are HDMI 2.0 signals.

The image input signal comprises two image input sub-signals, and the image region signal comprises two image sub-signals. The four image input signals are respectively an image input signal of the top left screen, an image input signal of bottom left screen, an image input signal of the top right screen, and an image input signal of the bottom right screen. Accordingly, the four image region signals are respectively an image signal of the top left screen, an image signal of the bottom left screen, an image signal of the top right screen, and an image signal of the bottom right screen.

Specifically, the signal generating circuit 8 comprises a decoder 81, a decoder 82, and a decoder 83.

The decoder 81 is configured to segment the image input signal of the top left screen into two image input sub-signals, and then to send the two image input sub-signals to the decoder 82 and the decoder 83, respectively.

The decoder 82 is configured to conduct a TTL format conversion to a first image sub-signal in the image input signal of the top left screen to thereby obtain a TTL-format first image sub-signal, and then to send the TTL-format first image sub-signal to the data generating chip 1.

The decoder 83 is configured to conduct a TTL format conversion to a second image input sub-signal in the image input signal of the top left screen to thereby obtain a TTL-format second image sub-signal, and then to send the TTL-format second image sub-signal to the data generating chip 1.

Specifically, the signal generating circuit 5 comprises a decoder 51, a decoder 52, and a decoder 53.

The decoder 51 is configured to segment the image input signal of the bottom left screen into two image input sub-signals, and then to send the two image input sub-signals to the decoder 52 and the decoder 53, respectively.

The decoder 52 is configured to conduct a TTL format conversion to a first image input sub-signal in the image input signal of the bottom left screen to thereby obtain a TTL-format first image sub-signal, and then to send the TTL-format first image sub-signal to the data generating chip 1.

The decoder 53 is configured to conduct a TTL format conversion to a second image input sub-signal in the image input signal of the bottom left screen to thereby obtain a TTL-format second image sub-signal, and then to send the TTL-format image sub-signal to the data generating chip 1.

Specifically, the signal generating circuit 9 comprises a decoder 91, a decoder 92, and a decoder 93.

The decoder 91 is configured to segment the image input signal of the top right screen into two image input sub-signals, and then to send the two image input sub-signals to the decoder 92 and the decoder 93, respectively;

The decoder 92 is configured to conduct a TTL format conversion to a first image input sub-signal in the image input signal of the top right screen to thereby obtain a TTL-format first image sub-signal, and then to send the TTL-format first image sub-signal to the data generating chip 2.

The decoder 93 is configured to conduct a TTL format conversion to a second image input sub-signal in the image signal of the top right screen to thereby obtain a TTL-format second image sub-signal, and then to send the TTL-format second image sub-signal to the data generating chip 2.

Specifically, the signal generating circuit 10 comprises a decoder 101, a decoder 102, and a decoder 103.

The decoder 101 is configured to segment the image input signal of the bottom right screen into two image input sub-signals and then to send the two image input sub-signals to the decoder 101 and the decoder 103, respectively.

The decoder 102 is configured to conduct a TTL format conversion to a first image input sub-signal in the image input signal of the bottom right screen to thereby obtain a TTL-format first image sub-signal, and then to send the TTL-format first image sub-signal to the data generating chip 2.

The decoder 103 is configured to conduct a TTL format conversion to a second image input sub-signal in the image input signal of the bottom right screen to thereby obtain a TTL-format second image sub-signal, and then to send the TTL-format second image sub-signal to the data generating chip 2.

As shown in FIG. 7, the image format of the image signals of the top left screen is 1920×2160@60 Hz×2, where each arrow represents an image sub-signal, and as such, the image format of the image sub-signal is 1920×2160@60 Hz. The image format of the image signals of the bottom left screen is 1920×2160@60 Hz×2, where each arrow represents 1920×2160@60 Hz.

As shown in FIG. 8, the image format of the image signals of the top right screen is 1920×2160@60 Hz×2, where each arrow represents an image sub-signal, and as such, the image format of the image sub-signal is 1920×2160@60 Hz. The image format of the image signals of the bottom right screen is 1920×2160@60 Hz×2, where each arrow represents an image sub-signal, and as such, the image format of the image sub-signal is 1920×2160@60 Hz.

Specifically, the data generating chip 1 further comprises a first receiving port (Port1 Video Rx) 18 and a memory control circuit (Memory Controller) 13.

The first receiving port 18 is configured to receive the image signal of the top left screen sent by the signal generating circuit 8, to conduct image format conversion to the image signal of the top left screen to thereby obtain a conversion signal of the top left screen, and then to send the conversion signal of the top left screen to the memory control circuit 13.

The second receiving port 11 is configured to receive the image signal of the bottom left screen sent by the signal generating circuit 5, to conduct image format conversion to the image signal of the bottom left screen to thereby obtain a conversion signals of the bottom left screen, and then to send the conversion signals of the bottom left screen to the memory control circuit 13.

The memory control circuit 13 is configured to conduct image format conversion to the conversion signal of the top left screen and to the conversion signal of the bottom left screen under control of a local clock of the DDR output to thereby obtain the conversion signals of the left half screen, and then to send the conversion signal of the left half screen to the splitting circuit 12.

As shown in FIG. 7, the image format of the conversion signals of the top left screen is 960×2160@60 Hz×4, and the image format of the conversion signals of the bottom left screen is 960×2160@60 Hz×4. As such, the image format of the combination-treated conversion signal of the top left screen and of the bottom left screen that enters the memory control circuit 13 is 960×2160@60 Hz×8. The image format of the conversion signals of the left half screen obtained through the memory control circuit 13 conducting an image format conversion to the signals with an image format of 960×2160@60 Hz×8 is 480×4320@60 Hz×8.

Specifically, the data generating chip 2 further comprises a third receiving port (Port 3 Video Rx) 27 and a fourth receiving port (Port4 Video Rx) 28.

The third receiving port 27 is configured to receive the image signal of the top right screen sent by the signal generating circuit 9, to conduct image format conversion to the image signal of the top right screen to thereby obtain a conversion signal of the top right screen, and then to send the conversion signal of the top right screen to the memory control circuit 23;

The fourth receiving port 28 is configured to receive the image signal of the bottom right screen sent by the signal generating circuit 10, to conduct image format conversion to the image signal of the bottom right screen to thereby obtain a conversion signal of the bottom right half screen, and then to send the conversion signal of the bottom right screen to the memory control circuit 23.

The memory control circuit 23 is configured to conduct image format conversion to the conversion signal of the top right screen and the conversion signal of the bottom right screen under control of a local clock of the DDR output to thereby obtain the conversion signals of the right half screen, and then to output the conversion signals of the right half screen to the splitting circuit 22.

As shown in FIG. 8, the image format of the conversion signal of the top right screen is 960×2160@60 Hz×4, and the image format of the conversion signal of the bottom right screen is 960×2160@60 Hz×4. As such, the image format of the combination-treated signal of the conversion signal of the top right screen and the conversion signal of the bottom right screen that enters the memory control circuit 23 is 960×2160@60 Hz×8, and the image format of the conversion signal of the right half screen obtained through the memory control circuit 23 conducting an image format conversion to the signals with the image format of 960× 2160@60 Hz×8 is 480×4320@60 Hz×8.

Specifically, the splitting circuit 12 is configured to cache the conversion signals of the left half screen in the chip, and then to send the cached conversion signals of the left half screen to the gating circuit 15. The gating circuit 15 is configured to enable the conversion signals of the left half screen with a set image format, and then to send the enabled conversion signals of the left half screen to the output circuit 16.

Herein, the set image format is 480×4320@60 Hz×8, so that the conversion signals of the left half screen can be enabled. The output circuit 16 is configured to conduct a signal conversion processing to the conversion signals of the left half screen according to the V-By-One protocol to thereby generate the image data of the left half screen. As such, the image data of the left half screen is V-By-One protocol data.

Specifically, the splitting circuit 22 is configured to cache the conversion signals of the right half screen in the chip, and then to send the cached conversion signals of the right half screen to the gating circuit 25. The gating circuit 25 is configured to enable the conversion signals of the right half screen with a set image format, and then to send the enabled conversion signals of the right half screen to the output circuit 26.

Herein, the set image format is 480×4320@60 Hz×8, so that the conversion signals of the right half screen can be enabled. The output circuit 26 is configured to conduct a signal conversion processing to the conversion signals of the right half screen according to the V-By-One protocol to thereby generate the image data of the right half screen. As such, the image data of the right half screen is V-By-One protocol data.

Furthermore, each data generating chip is configured to conduct image format conversion to a plurality of image region signals to generate image conversion signals, to obtain edge pixel signals corresponding to the image conversion sub-signals in the image conversion signals, to combine an image conversion sub-signal and the edge pixel signals corresponding to the image conversion sub-signal to generate the combination-treated image conversion sub-signal, to conduct data processing to the combination-treated image conversion sub-signal to generate corresponding image region data, and then to send the image region data to the corresponding data processing chip.

Herein, the image conversion signal comprises a plurality of image conversion sub-signals, and the image conversion signal can comprise the conversion signal of the left half screen or the conversion signal of the right half screen.

As shown in FIG. 7, the conversion signal of the left half screen comprises eight image conversion sub-signals. The data generating chip 1 is configured to obtain edge pixel signals corresponding to the image conversion sub-signals of the conversion signal of the left half screen, to combine the image conversion sub-signals and the edge pixel signals corresponding to the image conversion sub-signals to generate the combination-treated image conversion sub-signals.

Herein the combination-treated conversion signals of the left half screen comprise each of the combination-treated image conversion sub-signals. The specific data processing of the edge pixel signals of the conversion signals of the left half screen are substantially same as that of the edge pixel signals shown in FIG. 6, and the details can be referenced to the processing method of the edge pixel signals under Mode 2 as shown in FIG. 6, and will not be repeated herein.

As shown in FIG. 8, the conversion signal of the right half screen can comprise eight image conversion sub-signals. The data generating chip 2 is configured to obtain edge pixel signals corresponding to the image conversion sub-signals of the conversion signal of the right half screen, to combine the image conversion sub-signals and the edge pixel signals corresponding to the image conversion sub-signals to generate the combination-treated image conversion sub-signals.

Herein the combination-treated conversion signals of the right half screen comprise each of the combination-treated image conversion sub-signals. The specific data processing of the edge pixel signals of the conversion signals of the right half screen are substantially same as that of the edge pixel signals as shown in FIG. 6, and the details can be referenced to the processing method of the edge pixel signals under Mode 2 as shown in FIG. 6, and will not be repeated herein.

The RAM of the data generating chip 1 is configured to send the combination-treated conversion signals of the left half screen to the gating circuit 15, and the RAM of the data generating chip 2 is configured to send the combination-treated conversion signals of the right half screen to the gating circuit 25.

The subsequent processing processes of the remaining circuits in the data generating chip 1 and the data processing chip 3, and the remaining circuits in the data generating chip 2 and the data processing chip 4 are substantially same as those in Mode 1, and thus will not be repeated herein.

The display control device as described above comprises at least two data generating chips and at least two data processing chips, wherein each data processing chip corresponds to each data generating chip. Through a segmented processing to image signals by means of multiple data generating chips and multiple data processing chips, the image processing by chips having a relatively low cost can be achieved, which can ultimately lead to a reduced cost in the chip usage.

In a second aspect, the present disclosure further provides a display apparatus.

The display apparatus comprises a display panel and a display control device. Herein, the display panel is configured to receive the image output signals, and the display control device can be the display control device according to any one of the aforementioned embodiments as described above.

In the display apparatus as described above, the display control device comprises at least two data generating chips and at least two data processing chips, wherein each data processing chip corresponds to each data generating chip. Through a segmented processing to image signals by means of multiple data generating chips and multiple data processing chips, the image processing by chips having a relatively low cost can be achieved, which can ultimately lead to a reduced cost in the chip usage.

In a third aspect, the present disclosure further provides a display control method.

Figure 9:
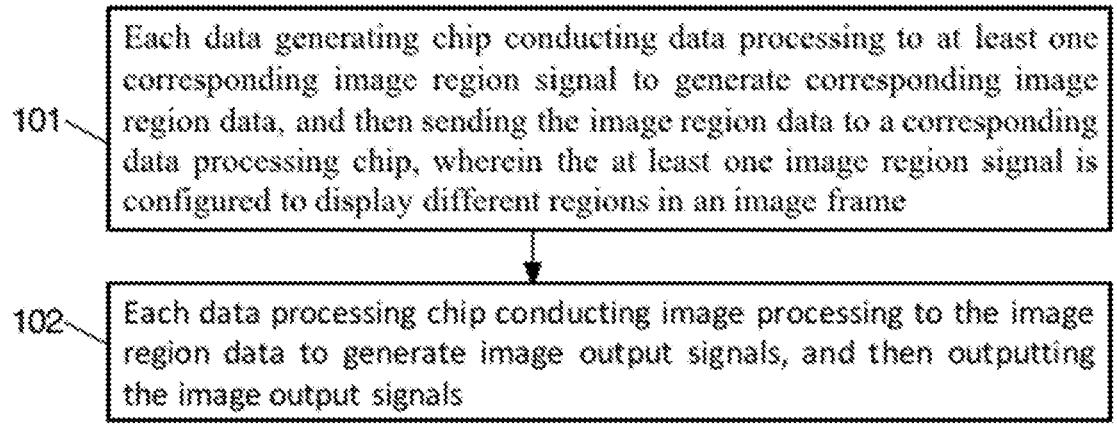
FIG. 9 is a flowchart illustrating the display control method according to some embodiments of the present disclosure.

FIG. 9 is a flowchart illustrating the display control method according to some embodiments of the present disclosure. As shown in FIG. 9, the display control method is utilized in a display control device. Herein the display control device comprises at least two data generating chips and at least two data processing chips, wherein each data processing chip corresponds to each data generating chip.

The display control method comprises the following steps:

Step 101: each data generating chip conducting data processing to at least one corresponding image region signal to generate corresponding image region data, and then sending the image region data to a corresponding data processing chip, wherein the at least one image region signal is configured to display different regions in an image frame;

Step 102: each data processing chip conducting image processing to the image region data to generate image output signals, and then outputting the image output signals.

In the display control method as described above, the display control device comprises at least two data generating chips and at least two data processing chips, wherein each data processing chip corresponds to each data generating chips. Through a segmented processing to image signals by means of the multiple data generating chips and the multiple data processing chips, the image processing by chips having a relatively low cost can be achieved, which can ultimately lead to a reduced cost in the chip usage.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display control device, comprising a plurality of data generating chips and a plurality of data processing chips, corresponding to one another in a one-to-one relationship, wherein:
   the plurality of data generating chips are configured to receive an image signal comprising a plurality of image region signals, wherein:
      each image region signal corresponds to a different region of an image frame; and
      each data generating chip is configured to receive, and to conduct data processing to, at least one image region signal to generate image region data, and to send the image region data to a corresponding data processing chip; and
   each data processing chip is configured to conduct image processing to the image region data from a corresponding data generating chip to generate an image output signal, and to output the image output signal;
   each data generating chip comprises a splitting circuit, an up-scaling circuit, a gating circuit, and an output circuit, wherein:
   the splitting circuit is configured to split the at least one image region signal into a plurality of splitted image region signals, and to send one splitted image region signal to the up-scaling circuit;
   the up-scaling circuit is configured to conduct an up-scaling processing to the one splitted image region signal to thereby generate, and to send to the gating circuit, an up-scaled image region signal;
   the gating circuit is configured to enable the up-scaled image region signal with a set image format, and then to send the up-scaled image region signal that is enabled to the output circuit; and
   the output circuit is configured to conduct a signal conversion to the up-scaled image region signal to thereby generate, and to send to a corresponding data processing chip, the image region data.

2. The display control device of claim 1, wherein each data generating chip is further configured to receive at least one edge pixel signal corresponding to the at least one image regional signal, wherein:
   each data generating chip further comprises a memory control circuit, configured to combine the at least one image regional signal and the at least one edge pixel signal to thereby obtain combination-treated image region signal, to conducting data processing to the combination-treated image sub-signal to thereby generate the image region data, and then to send the image region signal to the splitting circuit.

3. The display control device of claim 1, wherein the plurality of data generating chips comprise a first data generating chip and at least one second data generating chip, wherein:
   the first data generating chips comprises a receiving port, configured to receive, and to send to a first splitting circuit thereof, the at least one image region signal, wherein the first splitting circuit comprises a plurality of channels, and is configured to send a first splitted image region signal to the up-scaling circuit in the first data generating chip, and to send one second splitted image region signal to a second splitting circuit in one of the at least one second data generating chip via one of the plurality of channels.

4. The display control device of claim 1, wherein each generating chip comprises at least one receiving port, configured to receive, and to send to a splitting circuit thereof, the at least one image region signal.

5. The display control device of claim 1, further comprising at least one signal generating circuit, configured to receive an image input signal, to segment the image input signal into, and to send to the plurality of data generating chips, the plurality of image region signals.

6. The display control device of claim 5, wherein the at least one signal generating circuit consists of one signal generating circuit, configured to receive the image input signal, to segment the image input signal into, and to send to one of the plurality of data generating chips, the plurality of image region signals.

7. The display control device of claim 5, wherein a number of the at least one signal generating circuit is more than one, and each data generating chip corresponds to one or more of the at least one signal generating circuit.

8. The display control device of claim 5, wherein the at least one signal generating circuit is configured to receives the image input signal via HDMI or SoC.

9. The display control device of claim 1, wherein each data generating chips is an FPGA chip, and each data processing chip is an FPGA chip.

10. The display control device of claim 1, wherein a number of the data generating chips is two, and a number of the data processing chips is two.

11. A display apparatus, comprising a display panel, and a display control device according to claim 1, wherein the display panel is configured to receive the image output signal from the display control device.

12. A display control device, comprising a plurality of data generating chips and a plurality of data processing chips, corresponding to one another in a one-to-one relationship, wherein:
the plurality of data generating chips are configured to receive an image signal comprising a plurality of image region signals, wherein:
each image region signal corresponds to a different region of an image frame; and
each data generating chip is configured to receive, and to conduct data processing to, at least one image region signal to generate image region data, and to send the image region data to a corresponding data processing chip;
each data processing chip is configured to conduct image processing to the image region data from a corresponding data generating chip to generate an image output signal, and to output the image output signal;
wherein each data processing chip comprises a receiving circuit, an enhancing circuit, a pixel processing circuit, a memory controlling circuit, and an outputting circuit, wherein:
the receiving circuit is configured to receive the image region data from a corresponding data generating chip, to cache the image region data, to convert cached image region data into, and to send to the enhancing circuit, parallel signals;
the enhancing circuit is configured to conduct image effect enhancement to the parallel signals, and to send enhanced parallel signals to the pixel processing circuit;
the pixel processing circuit is configured to conduct pixel processing to the enhanced parallel signals, and then to send processed parallel signals to the memory controlling circuit;
the memory controlling circuit is configured to conduct image format conversion to the processed parallel signals to obtain a to-be-outputted signal, and then to output the to-be-outputted signal to the outputting circuit; and
the outputting circuit is configured to conduct format conversion to the to-be-outputted signal to generate an image output signal, and then to send the image output signal to a time sequence controller.

13. The display control device of claim 12, wherein each data processing chip further comprises an asynchronous FIFO, configured to write the to-be-outputted signal from the memory controlling circuit under control of a local clock and to output the to-be-outputted signal to the outputting circuit, wherein:
the asynchronous FIFO is configured to comprise a same synchronous clock such that the to-be-outputted signal can be outputted to the outputting circuit under control of the same synchronous clock.

14. The display control device of claim 12, wherein the asynchronous FIFO comprises a crystal oscillator synchronous FIFO.

15. The display control device of claim 12, wherein the plurality of data processing chips comprise a first data processing chip and at least one second data processing chip, wherein:
the first data processing chip comprises a calculation circuit, configured to receive a second to-be-outputted signal sent by each of the at least one second data processing chip, to generate a brightness control signal based on a first to-be-outputted signal generated by the first data processing chip and the second to-be-outputted signal sent by the each of the at least one second data processing chip, and to output the brightness control signal to a controller, such that the controller can adjust a brightness of a backlight source according to the brightness control signal.

16. A display control method, employing a display control device comprising a plurality of data generating chips and a plurality of data processing chips, corresponding to one another in a one-to-one relationship, the method comprising:
each data generating chip conducting data processing to at least one image region signal to thereby generate, and to send to a corresponding data processing chip, image region data, wherein each image region signal corresponds to a different region of an image frame; and
each data processing chip conducting image processing to the image region data to thereby generate an image output signal, and to output the image output signal;
the method further comprising, prior to the each data generating chip conducting data processing to at least one image region signal to thereby generate, and to send to a corresponding data processing chip, image region data:
each data generating chip receiving the at least one image region signal and at least one edge pixel signal corresponding to the at least one image region signal; and
the each data generating chip conducting data processing to at least one image region signal to thereby generate, and to send to a corresponding data processing chip, image region data comprises:
combining the at least one image region signal and the at least one edge pixel signal to thereby obtain a combination-treated image region signal; and
conducting the data processing to the combination-treated image region signal to thereby generate the image region data.

17. The display control method according to claim 16, wherein the combining the at least one image region signal and the at least one edge pixel signal to thereby obtain a combination-treated image region signal comprises:
combining each image sub-signal and edge pixel signals of each another image sub-signal neighboring to the each image sub-signal to thereby generate the combination-treated image region signal.

* * * * *